W. MORRISON.
SECONDARY BATTERY.
APPLICATION FILED JUNE 8, 1903.
916,575.
Patented Mar. 30, 1909.
2 SHEETS—SHEET 2.
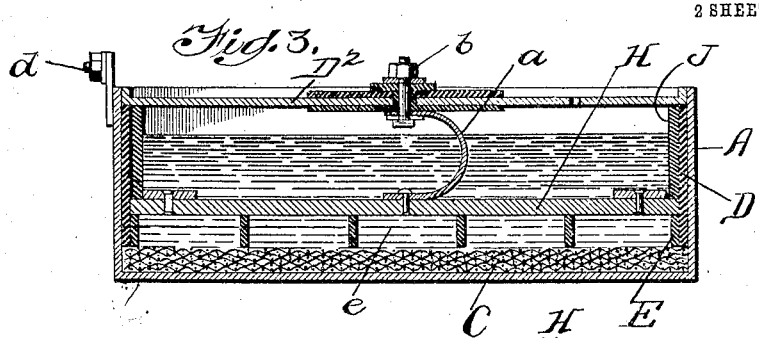
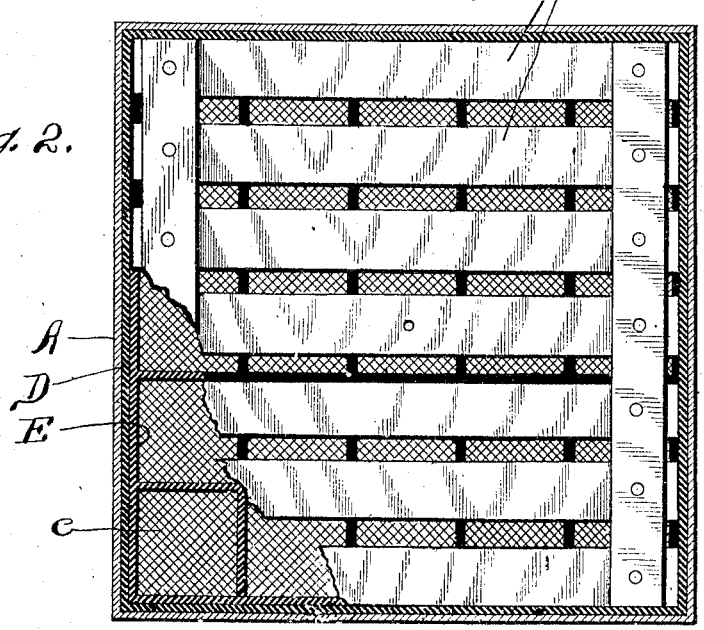
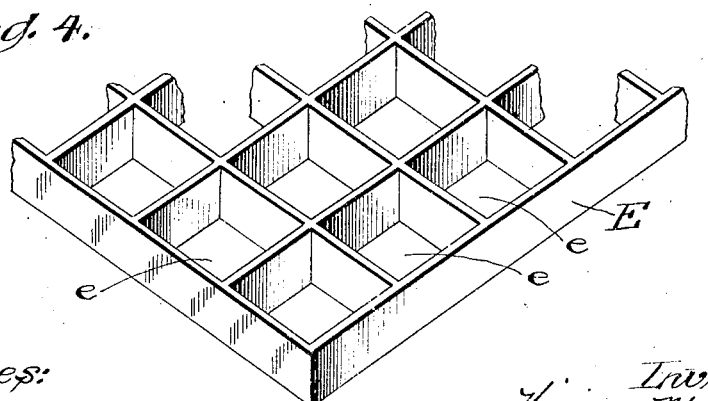
Witnesses:
J B Weir
Robert H Weir
Inventor.
William Morrison
By Bulkley & Durand
Attys

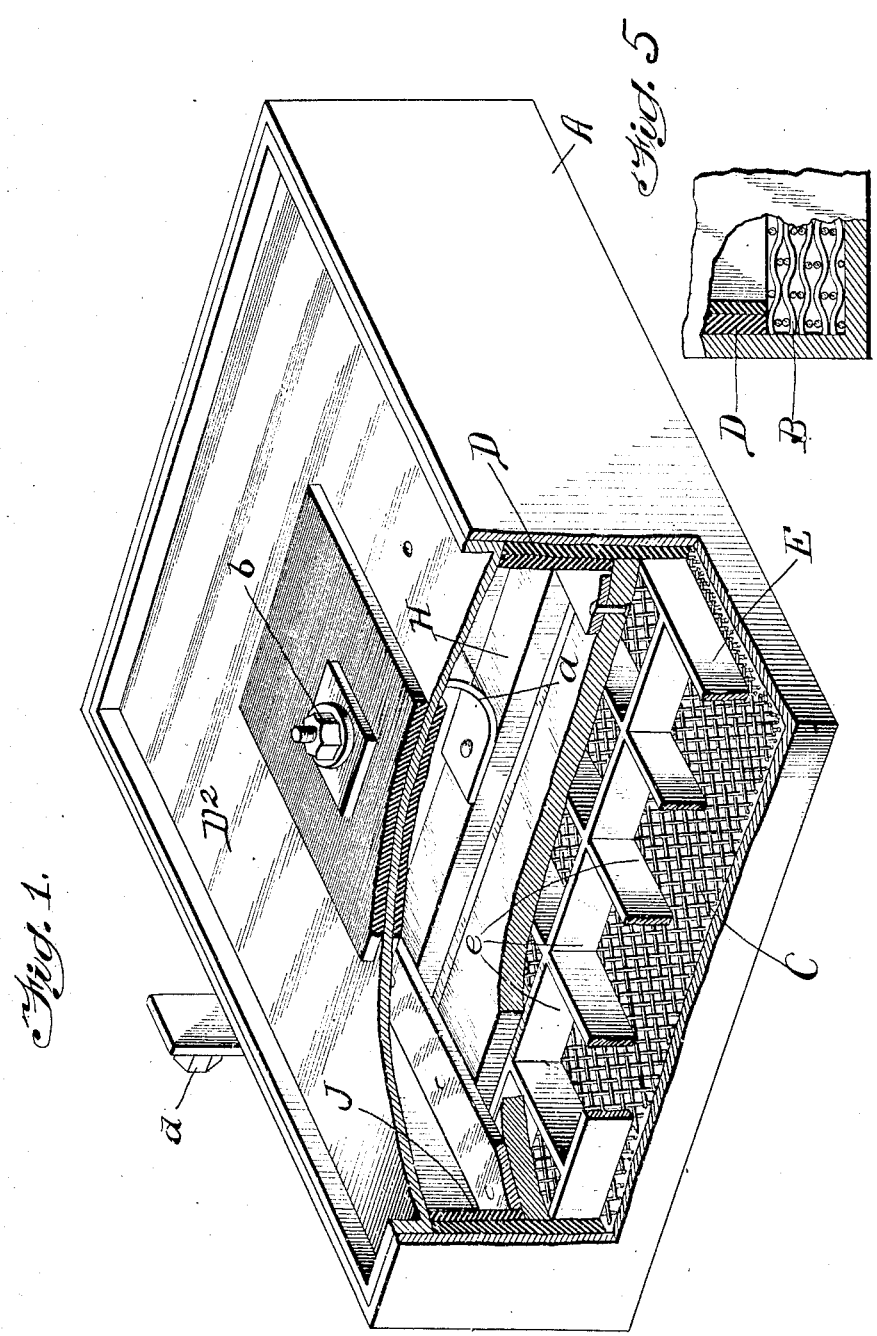

UNITED STATES PATENT OFFICE.

WILLIAM MORRISON, OF CHICAGO, ILLINOIS.

SECONDARY BATTERY.

No. 916,575.          Specification of Letters Patent.     Patented March 30, 1909.

Application filed June 3, 1903. Serial No. 160,645.

*To all whom it may concern:*

Be it known that I, WILLIAM MORRISON, a citizen of the United States of America, and resident of Chicago, Cook county, Illinois, have invented a certain new and useful Improvement in Secondary Batteries, of which the following is a specification.

It has been my experience, as a result of long and exhaustive experiment, in connection with that class of secondary batteries in which caustic potash or caustic soda or other alkaline is used as the electrolyte and zinc dissolved into the solution as one of the active elements, that with the electrodes in a vertical position, the zinc, by reason of the great specific gravity of the solution will deposit more upon the bottom portion of the electrode than upon the top thereof, that is, the specific gravity cannot be kept practically uniform throughout the solution, and gradually, in the continued charge and discharge, the zinc is deposited more upon the bottom than upon the top of the electrodes, until finally all, or nearly all, of the zinc falls or is deposited upon the bottom of the cell. Further, I have found it impossible to so construct or preliminarily treat the electrodes or supports for the zinc so that they will hold the zinc in place against the jar of the battery and wash of the solution, which tends to separate the zinc from its support, for, although during the first few discharges zinc will adhere, the tendency to adhere, or capacity of adhesion, is gradually diminished in each successive charge or discharge, until finally the electrode becomes unable to hold the zinc deposit. I have preliminarily treated the electrode, or support, by depositing cadmium or silver upon the support, and amalgamating it to form a suitable surface on the electrode support to receive the zinc. But I found that although this plan was of some substantial assistance, good results could not be obtained for any practical period of time. Further, I found in my experience, that the solution gradually loses its capacity to dissolve and redissolve the zinc in the discharge, although in the first few discharges a sufficient quantity of the zinc is dissolved and taken up into the solution during the discharge the capacity of the solution to take up or redissolve the zinc gradually becomes less and less in the successive discharges, so that to continuously operate a battery of this character, for even a short period of time, it is necessary to employ a quantity of solution largely in excess of that actually necessary to do the work, because of this gradual diminution of the capacity of the solution to redissolve the zinc. For this reason, batteries of this type are impractical, because too bulky and heavy and because they can only be used for a short period of time and renewed at a great expense.

In my experiments, I sought to accomplish the desired results in a different battery of the alkaline type, by packing an oxid of zinc, or reduced spongy zinc, in a grid, and endeavored to prevent the solution from dissolving the zinc, by adding thereto some such element, or elements, as aluminum, arsenic, or molybdenum, for which the potash or soda has a greater affinity than for zinc, and which is not readily deposited electrically from the solution. I soon found that the addition of one of these elements, or combination of elements, would not entirely prevent the zinc from being dissolved by the solution. And I also found that although these elements are not readily electro-deposited they would electro-deposit upon the negative-pole electrode in a quantity sufficient to set up local action, and that the solution also had a tendency to lose its capacity to hold these elements in the solution, so that gradually the quantity of these elements deposited upon the negative-pole electrode in each successive discharge increased. I found that to prevent mechanical washing out of the oxid of zinc in vertical plates it was necessary to pack it in the grid so tightly that the solution could not circulate with sufficient freedom into the negative-pole electrode, and the same difficulty was encountered when any sort of covering was used about the electrode. Also in my experiments I provided a positive electrode disposed horizontally in the bottom of the cell and a negative-pole electrode suspended above the positive, and then found that the solution gradually lost its capacity to dissolve the zinc, as previously mentioned, and would oxidize it, whereupon the zinc would fall to or deposit upon the positive electrode and remain there. In connection with this experiment, although the solution at the point of contact between the horizontal electrodes was of equal density because of the horizontal position, and although I amalgamated the negative-pole electrode in the manner previously described, the mercury would be dissolved and leave the support and fall upon the electrode below, leaving the support unfit to receive and hold the zinc deposit.

The object of my invention is to provide a practical battery of the alkaline type, in which zinc is one of the elements, and which shall be capable of use for all the various purposes to which batteries may be put, and which does not have the recited or other disadvantages.

To this end my invention consists primarily in a secondary battery, in which the electrolyte is a solution of caustic potash, or caustic soda, or other suitable alkaline solution, and in which zinc constitutes the active material of the positive electrode, and which negative-pole electrode is placed in a substantially horizontal position at or near the bottom of the containing cell, with the positive electrode disposed above said negative-pole electrode.

My invention consists in certain other features, to be more particularly described and pointed out, reference being now had to the accompanying drawings, in which:

Figure 1 is a perspective view of the complete cell, partly broken away to show the interior construction and arrangement. Fig. 2 is a plan view with the cover and solution removed, showing the positive electrode partly broken away and with the insulating protector partly in section. Fig. 3 is a cross sectional view of the complete cell. Fig. 4 is a detail view of a fragment or portion of the insulating protector. Fig. 5 is a detail view of the corner of the cell partly broken away, and in section, showing the negative-pole electrode consisting of a plurality of screens superimposed one upon the other and resting upon the bottom of the cell.

In carrying out my invention, and as constituting one specific embodiment thereof, I provide preferably a metal cell A which may be of copper, iron, steel, or other suitable metal, within which I build up one upon the other in the bottom of the cell, a number of screens of woven wire or perforated metal, designated at B. These screens, which are preferably of copper, are preliminarily treated by plating them with silver, copper, or other suitable metal to form a metallic, spongy and porous covering capable of holding a large quantity of mercury. I then fill the spongy covering with mercury by dipping the screens into a vat of cyanid of mercury and then again into a vat of metallic mercury. Care, however, should be taken to wash out the cyanid. These screens are then electro-plated in a solution of caustic potash having zinc dissolved thereon, until a necessary quantity of zinc is deposited upon the screens. The screens so prepared are then deposited one upon the other in the bottom of the cell, which cell has been previously plated and amalgamated on the bottom. (Fig. 5.) A sufficient number of these screens are so disposed to form a negative-pole electrode C, of a sufficient thickness or depth. Above this negative-pole electrode is an insulating band D, to be more particularly described. I provide a grid shaped protecting member E, of insulating material, having cells e passing through it from top to bottom. Upon the top of this member E is the positive electrode H of copper, silver, nickel, or other suitable material, of the character used in the well-known types of alkaline batteries. It should be preferably perforated, or so constructed as to permit the gas to pass above the negative electrode and permit the free circulation of the liquid.

As shown, the negative-pole electrode C is made up of a number of superimposed screens B, upon the bottom of the cell A. An insulating band D extends completely about the interior of the cell and rests against the sides thereof, the lower edge of said insulating band resting upon the marginal edge of the negative-pole electrode and extending upward nearly to the top of the cell. The insulating protector E is placed upon the top of the negative-pole electrode and within the outer insulating band D. The positive electrode H is placed upon the top of the insulating protector E and a second inner and insulating band J extending completely about the interior of the cell and resting against the outer insulating band D, rests, at its lower edge, upon the marginal edge of the positive electrode. The cover $D^2$ sits within the cell A and bears upon the upper edges of the two insulating bands D and J, so that when the cover is pressed downwardly and soldered in place firmly the outer insulating band presses the marginal edges of the negative-pole electrode firmly into place and the inner insulating band J pressing downward upon the positive electrode in turn causes the insulating protector E to firmly press upon the negative-pole eletrode beneath; thus binding the various screens of the negative-pole electrode firmly together and to the bottom of the cell. If found desirable, these various screens may be sewed together or soldered, or otherwise fastened together, and the electrode support soldered to the cell itself, thus giving a greater amount of conductivity to the electrode support and more intimate contact with the cell itself.

It will be observed that the insulating band D insulates the sides of the cell from the electrical action of the battery, during the charge and discharge. The insulating protector E serves two purposes, the one to insulate the negative-pole electrode from the positive electrode and hold the negative-pole electrode firmly in place, and the other purpose to subdivide the interior of the cell between the negative-pole and positive electrodes into sections of such size as to confine the wash of the solution within comparatively small areas, so that if the zinc in the solution should become detached from the negative-pole electrode by the small amount of wash still remaining, or otherwise it cannot shift such a distance as to gather together a sufficient quantity of zinc to short circuit, or otherwise affect the operation of the battery.

A conductor $a$ extends to and is connected with a binding post $b$ which extends through the cover and is isolated therefrom and fastened thereto by insulating plates so secured in place as to prevent leakage. The other binding post $d$ is fastened to the metallic cell itself.

The solution may be of caustic potash or caustic soda, although I prefer the former. I prefer to purify the caustic potash by electro-plating between insoluble electrodes, with a suitable electric current, until the greater portion of the sediment is deposited on the electrodes, or precipitated.

The negative-pole electrode support consists of a number of wire screens, previously described, placed one upon the other in a sufficient number to provide a porous, open and conducting bed or receptacle for the reception of a sufficient quantity of zinc to give the desired discharge. The zinc is deposited upon the upper screens, or may be deposited on all the screens, the screens with their openings permitting the residuum or foreign products to penetrate farther into the electrode and maintain the greater part of the active portion of the electrode upon the top thereof.

In the operation of the battery, and in the first charge, the zinc having been previously electro-deposited, hydrogen is liberated and the positive electrode is oxidized in the well-known manner. In the discharge the zinc is dissolved into the solution and the positive electrode is reduced in the well-known manner. If the electrodes are of greater capacity than the solution employed, the solution will dissolve and take up the zinc to its ultimate capacity and then the remainder of the zinc will be oxidized in the further continued discharge and consequent generation of current, this portion of the zinc remaining as an oxid of zinc in the negative-pole electrode. And it is apparent that the positive electrode will be still further reduced. It is also apparent that as the solution gradually loses its capacity to redissolve and take up the zinc, the quantity of oxid of zinc in the negative-pole electrode will gradually increase in the operation of the battery. In the second charge the zinc in the solution is first deposited upon the negative-pole electrode in the form of metallic zinc and then the liberated hydrogen reduces the oxid of zinc in the negative-pole electrode to metallic zinc, the positive electrode being oxidized. In the further successive charges and discharges, as the solution loses its capacity to redissolve the zinc, more and more of the oxid of zinc remains in and upon the positive electrode.

In my very early experiments, on my present type of battery, I deposited zinc upon the bottom of the metal cell, but found that the movements of the battery, such as it would receive in automobile work, would cause the solution to wash over the zinc and detach a part of it from its support and wash it to one side of the cell where it would short circuit the electrodes. This action would be facilitated by charging the battery too rapidly, as the zinc would be spongy and loose and thus more readily detached and shifted. I then tried one screen resting upon and held against the bottom of the cell, but soon found that although the zinc bound itself into and around the screen, a sediment deposited from the solution and possibly from the positive electrode settled upon the top of the screen, forming a coating which prevented the necessary adherence and density of the zinc deposit, and this led to the provision of a number of screens which provided a bed to hold the zinc and permit the sediment to penetrate farther into the electrode support. Therefore, in selecting these screens care should be taken to select a screen with sufficient mesh to provide free openings for the sediment and at the same time hold the zinc. By this means I found that the zinc was kept clean and practically free from foreign sediment, and was held in place permitting free circulation of the solution. As in the discharge the zinc is taken up into the solution the sediment settles farther toward the bottom of the cell and in the charge fresh and clean zinc is deposited, comparatively free from sediment, on the top of the electrode. The continued charge and discharge assists the natural tendency toward settlement of the sediment farther into the electrode leaving the top portion of the electrode comparatively free from sediment and in condition to receive the zinc. This screen formation also, by reason of its mesh, tends to prevent the sediment from being washed out of the screen into the solution.

The negative-pole electrode is thoroughly amalgamated before being placed in the cell, and this amalgam is preserved in each successive charge by providing an excess of mercury in the bottom of the cell. It is advisable to bind the screens tightly together and to the bottom of the cell so that the mercury may freely find its way from one screen to the other and thus maintain thorough and complete amalgamation. I found that under the reducing action of the charge on the negative-pole electrode, the mercury adheres and binds with a large proportion of the sediment, and also with the electrode itself, maintaining a thorough amalgamation for the reception of the deposited zinc and to prevent local action. This thorough amalgamation is made possible by reason of the location of the electrode in the bottom of the cell in substantially a horizontal position, and by the porous nature of the same. This is evident because the mercury may distribute itself through the electrode and cannot fall off from the electrode. The mercury is always in contact with the electrode.

After all of my experiments, I found that it was advantageous, in traction work, to provide means for preventing the wash of the solution upon the top of the negative-pole electrode. This is accomplished by providing a grid of insulating material having openings extending through it which subdivide the solution into small bodies, thus interrupting the wash of the solution and limiting that wash within small areas. Thus if any portion of the zinc does become detached, it will be a small portion and will be carried only a short distance and cannot therefore do much harm.

From the foregoing it will be readily apparent that as the zinc contained in and upon an electrode in the bottom of the cell, it is in such a position that gravity tends to hold the zinc upon its support, and has no tendency to remove it therefrom, as in the case where the electrodes are vertical, or when the negative-pole electrode is above the negative. And when the zinc is dissolved in the solution and deposited back upon the electrode in the bottom of the cell, it is deposited in the direction of gravity upon the same relative position as before unaffected by the variation of density of the solution. Whereas, as previously explained, when the electrodes are vertical the variation of density of the solution causes the greater portion of the zinc to be deposited at the point of greatest density causing the deposit of zinc more and more toward the bottom of the electrode with each successive charge. Nor can the variation of density of the solution have any effect when the electrode is in the bottom of the cell because then the area of greatest density of the solution is directly upon and through the electrode. As gravity tends to hold the zinc in place in and on the electrode in the bottom of the cell, and as the zinc is previously deposited in a sufficient quantity for the capacity of the cell, and as the solution can continue to oxidize the zinc, to generate current in the operation of the battery, after it has become incapable of dissolving the zinc into the solution it is evident that a much smaller quantity of solution is necessary, very materially reducing the weight, bulk and cost of the battery. The alkaline solution cannot be neutralized by the zinc, as it generally requires about four or more molecules of hydrate of sodium or potassium to dissolve one molecule of zinc. This being the case, the solution is always strongly alkaline, and is capable of conducting the current in a satisfactory manner after it is saturated with the zinc, and the action of the battery then oxidizes the zinc, but does not dissolve it. It is thus evident that but a small amount of zinc will be dissolved by the electrolyte, the best results being obtained by the rapid charge and discharge of the battery. In the discharge the zinc is either dissolved into the solution or oxidized on the negative-pole electrode, separating and liberating the mercury, which tends to fall farther into the perforated electrode support. But in the charge, when the zinc is re-deposited upon the electrode in the form of metallic zinc and when the oxid of zinc in the electrode is reduced to metallic zinc, the tendency is to absorb the mercury back again into and throughout the mass of metallic zinc to provide an amalgam. If any of the mercury is oxidized during the discharge or removed down farther into the electrode, it is reduced to metallic mercury in the charge and absorbed up again into and through the electrode. Thus in each and every charge the electrode is maintained in proper condition to do the work. This result is not possible when the electrodes are vertical as the mercury tends to leave the electrode by gravitation, oxidization and washing off, as previously described.

I have shown and described herein the structure which I have found gives the best results and produces an operative battery, and it will be understood as to those features herein shown and described, but not claimed, that I reserve the right to claim the same in other applications filed concurrently herewith.

I am aware that electrodes of batteries have been positioned horizontally and arranged in the bottom of the cells in many other kinds of batteries, but

What I claim as my invention is:

1. In an electric reversible galvanic battery in which there is a suitable alkaline solution, a negative-pole electrode at or near the bottom of the cell, zinc in contact with the positive electrode, a positive electrode above the negative-pole electrode and insulating means located between said electrodes adapted to subdivide the entire body of the electrolyte between said electrodes, said zinc being greatly in excess of that which the electrolyte can dissolve, whereby the excess of zinc is oxidized by said electrolyte without dissolving, thereby producing an electric current.

2. In an electric reversible galvanic battery in which there is a suitable alkaline solution, a negative-pole electrode at or near the bottom of the cell, zinc and mercury in contact with said electrode, a positive electrode above the negative-pole electrode and insulating means located between said electrodes adapted to subdivide the entire body of the electrolyte between said electrodes, said zinc being greatly in excess of that which the electrolyte can dissolve, whereby the excess of zinc is oxidized by said electrolyte without dissolving, thereby producing an electric current.

3. In an electric reversible galvanic battery in which there is a suitable alkaline solution, zinc as the positive active element, a negative-pole electrode so disposed at or near the bottom of the cell in a substantially horizontal position that gravity tends to cause the active material to remain in contact with the negative-pole electrode, a positive electrode above the negative-pole electrode, said zinc being greatly in excess of that which the electrolyte can dissolve, whereby the excess of zinc is oxidized by said electrolyte without dissolving, thereby producing an electric current.

4. In an electric reversible galvanic battery in which there is a suitable alkaline solution, zinc as the positive active element, a negative-pole electrode disposed at or near the bottom of the cell in substantially a horizontal position so that gravity tends to cause the active material to remain in contact with the negative-pole electrode, and a positive electrode above the negative-pole electrode, together with mercury in contact with the negative-pole electrode, the mercury reamalgamating the negative-pole electrode in each successive charge, and insulating means between said electrodes adapted to subdivide the body of electrolyte therebetween, said zinc being greatly in excess of that which the electrolyte can dissolve, whereby the excess of zinc is oxidized by said electrolyte without dissolving, thereby producing an electric current.

Signed by me at Chicago, Cook county, Illinois, this 6th day of June, 1903.

WILLIAM MORRISON.

Witnesses:
   Chas. C. Bulkley,
   Wm. A. Harders.